(12) United States Patent
Sarma et al.

(10) Patent No.: US 10,317,578 B2
(45) Date of Patent: Jun. 11, 2019

(54) SELF-CLEANING SMUDGE-RESISTANT STRUCTURE AND RELATED FABRICATION METHODS

(71) Applicant: HONEYWELL INTERNATIONAL INC., Morristown, NJ (US)

(72) Inventors: Kalluri R. Sarma, Mesa, AZ (US); John F. L. Schmidt, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/320,918

(22) Filed: Jul. 1, 2014

(65) Prior Publication Data

US 2016/0003985 A1   Jan. 7, 2016

(51) Int. Cl.
| | | |
|---|---|---|
| *G02B 1/18* | (2015.01) | |
| *C03C 17/23* | (2006.01) | |
| *B01J 27/24* | (2006.01) | |
| *B01J 35/02* | (2006.01) | |
| *G02B 1/12* | (2006.01) | |
| *G06F 3/041* | (2006.01) | |

(52) U.S. Cl.
CPC ............... *G02B 1/18* (2015.01); *B01J 27/24* (2013.01); *B01J 35/02* (2013.01); *C03C 17/23* (2013.01); *G02B 1/12* (2013.01); *G06F 3/041* (2013.01); *C03C 2204/08* (2013.01); *C03C 2217/212* (2013.01); *C03C 2217/23* (2013.01); *C03C 2217/477* (2013.01); *C03C 2217/71* (2013.01); *C03C 2217/77* (2013.01); *C03C 2218/31* (2013.01)

(58) Field of Classification Search
CPC . G02B 1/10; G02B 1/18; G02B 1/105; G02B 27/0006; B01J 27/24; B01J 35/02; G06F 3/041
USPC .................................................. 428/141–155
See application file for complete search history.

(56) References Cited

U.S. PATENT DOCUMENTS

| | | |
|---|---|---|
| 5,476,717 A | 12/1995 | Floch |
| 5,858,876 A | 1/1999 | Chew |
| 5,925,438 A | 7/1999 | Ota et al. |
| 6,440,858 B1 | 8/2002 | Canale et al. |
| 6,468,428 B1 * | 10/2002 | Nishii ................ B01D 53/88 210/497.3 |
| 6,480,250 B1 | 11/2002 | Matsufuji et al. |

(Continued)

FOREIGN PATENT DOCUMENTS

| | | |
|---|---|---|
| CN | 202208152 U | 5/2012 |
| CN | 102950099 A | 3/2013 |

(Continued)

OTHER PUBLICATIONS

TW Office Action for Application No. 100111638 dated Jun. 22, 2015.

(Continued)

*Primary Examiner* — Maria V Ewald
*Assistant Examiner* — Ethan Weydemeyer
(74) *Attorney, Agent, or Firm* — Lorenz & Kopf, LLP

(57) ABSTRACT

Apparatus for a smudge-resistant structure and related fabrication methods are provided. An exemplary smudge-resistant structure includes a transparent substrate having a macrostructured surface configured to reduce contact with the transparent substrate and an oxidizing layer overlying the macrostructured surface.

20 Claims, 2 Drawing Sheets

(56) References Cited

U.S. PATENT DOCUMENTS

| | | | |
|---|---|---|---|
| 6,950,234 | B1 | 9/2005 | Onishi |
| 8,252,436 | B1* | 8/2012 | Huang .................... C03C 17/00 428/426 |
| 2001/0030721 | A1 | 10/2001 | Z et al. |
| 2002/0130832 | A1 | 9/2002 | Baucom et al. |
| 2004/0067339 | A1* | 4/2004 | Gandon ............ B32B 17/10036 428/141 |
| 2004/0191527 | A1 | 9/2004 | Saitoh |
| 2005/0094275 | A1 | 5/2005 | Ikuhara et al. |
| 2005/0118433 | A1 | 6/2005 | Oles et al. |
| 2005/0170098 | A1 | 8/2005 | Baumann et al. |
| 2006/0008596 | A1 | 1/2006 | Pokorny et al. |
| 2006/0035060 | A1 | 2/2006 | Koyama et al. |
| 2006/0115623 | A1 | 6/2006 | Aizenberg et al. |
| 2006/0132945 | A1 | 6/2006 | Sano |
| 2006/0210798 | A1* | 9/2006 | Burda .................... A61K 33/00 428/402 |
| 2006/0240218 | A1 | 10/2006 | Parce |
| 2007/0014981 | A1 | 1/2007 | Chiang et al. |
| 2007/0231542 | A1 | 10/2007 | Deng |
| 2007/0237962 | A1* | 10/2007 | Liang ....................... G02F 1/167 428/411.1 |
| 2007/0273670 | A1 | 11/2007 | Nordahl |
| 2008/0095997 | A1* | 4/2008 | Chiang .................. G02B 1/105 428/215 |
| 2008/0123019 | A1* | 5/2008 | Oku .......................... F21V 5/02 349/64 |
| 2008/0199657 | A1 | 8/2008 | Capron et al. |
| 2008/0233378 | A1 | 9/2008 | Luthge et al. |
| 2008/0241479 | A1 | 10/2008 | Nghiem et al. |
| 2009/0041984 | A1 | 2/2009 | Mayers et al. |
| 2009/0061230 | A1* | 3/2009 | Berkei .................... B82Y 30/00 428/402.24 |
| 2009/0155965 | A1 | 6/2009 | Tseng et al. |
| 2009/0185276 | A1 | 7/2009 | Matsuhira |
| 2009/0191374 | A1 | 7/2009 | D'Urso et al. |
| 2009/0191734 | A1 | 7/2009 | Tomitaku et al. |
| 2010/0033818 | A1 | 2/2010 | Petcavich et al. |
| 2010/0195204 | A1* | 8/2010 | Walker .................... B82Y 20/00 359/507 |
| 2011/0028305 | A1 | 2/2011 | Lim et al. |
| 2011/0076450 | A1 | 3/2011 | Sharma |
| 2011/0287227 | A1* | 11/2011 | Moser .................. B81C 1/00206 428/164 |
| 2012/0154811 | A1 | 6/2012 | Pokorny et al. |
| 2012/0251706 | A1 | 10/2012 | Huang |
| 2013/0142994 | A1 | 6/2013 | Wang et al. |
| 2013/0295327 | A1* | 11/2013 | Zhang .................... B82Y 30/00 428/141 |
| 2014/0011013 | A1 | 1/2014 | Jin et al. |

FOREIGN PATENT DOCUMENTS

| | | |
|---|---|---|
| EP | 784775 A2 | 12/1996 |
| EP | 1661867 A1 | 5/2006 |
| EP | 2454207 B1 | 1/2017 |
| JP | 2000135755 A | 5/2000 |
| JP | 2001260267 A | 9/2001 |
| JP | 2006-239490 A | 9/2006 |
| JP | 2007301773 A | 11/2007 |
| JP | 2010096359 A | 4/2010 |
| JP | 2014071323 A | 4/2014 |
| KR | 20020017732 A | 3/2002 |
| KR | 20020041871 A | 6/2002 |
| WO | 2007097454 A1 | 8/2007 |
| WO | 2013/187506 | 12/2013 |

OTHER PUBLICATIONS

USPTO Office Action for U.S. Appl. No. 12/753,964 dated Jun. 23, 2011.
USPTO Final Office Action for U.S. Appl. No. 12/753,964 dated Dec. 8, 2011.
USPTO Advisory Action for U.S. Appl. No. 12/753,964 dated Feb. 9, 2012.
USPTO Office Action for U.S. Appl. No. 12/753,964 dated Mar. 2, 2012.
USPTO Final Office Action for U.S. Appl. No. 12/753,964 dated Jul. 13, 2012.
CN Office Action dated Jul. 25, 2014 for Application No. 2011100835483.
CN Office Action for Application No. 2011100835483. dated Mar. 10, 2015.
JP Office Action for Application No. 2011081971 dated Feb. 25, 2015.
USPTO Office Action for U.S. Appl. No. 12/753,964 dated Sep. 24, 2015.
TW Office Action for Application No. TW 100111638; dated Feb. 18, 2016.
USPTO Office Action, dated Apr. 13, 2016; U.S. Appl. No. 12/753,964.
EP Extended Search Report for Application No. EP 15171049.8 dated Nov. 26, 2015.
Korean Office Action for Application No. 10-2011-0027620 dated Dec. 7, 2016.
Taiwan Office Action for Application No. 100111638 dated Oct. 18, 2016.
EP Examination Report for Application No. 15171049.8 dated Mar. 27, 2018.
USPTO Decision on Appeal for U.S. Appl. No. 12/753,964 dated May 28, 2015.
Japanese Office Action for Patent Application No. 2015-123565 dated Dec. 5, 2019.

* cited by examiner

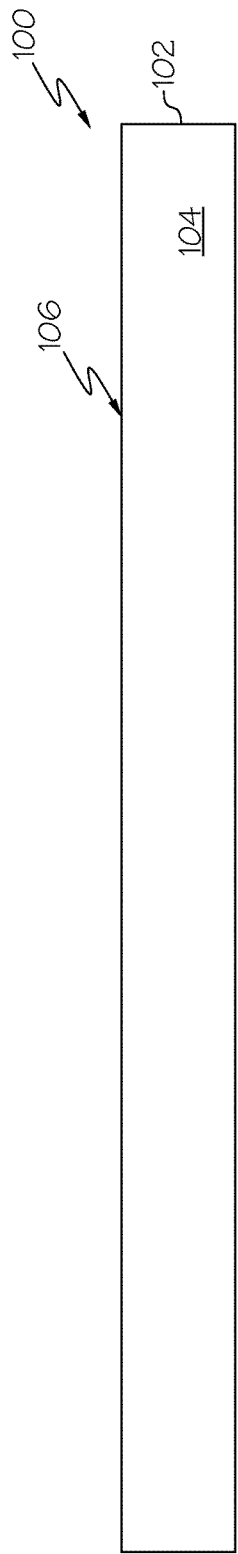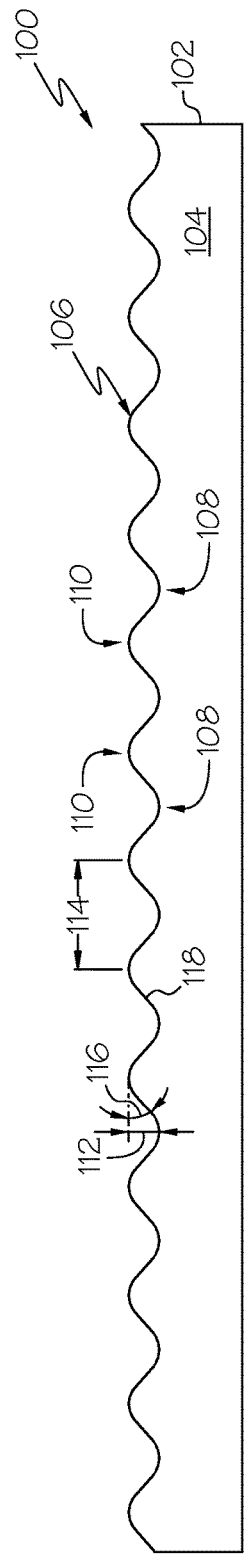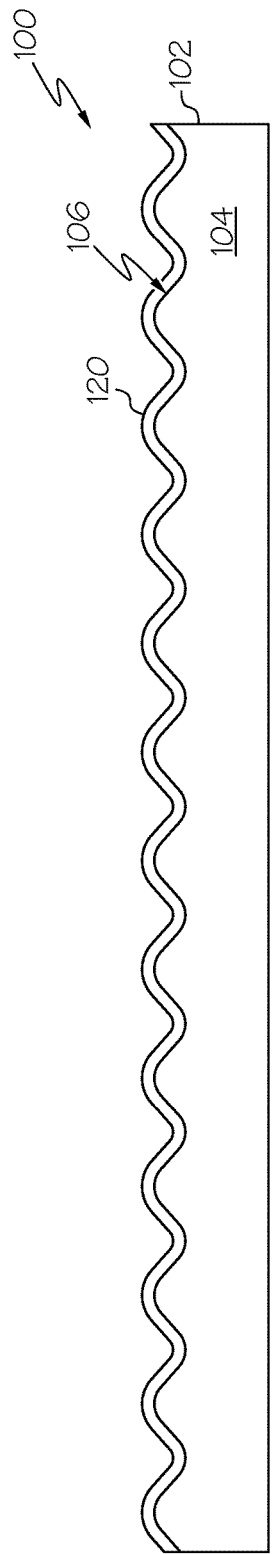

US 10,317,578 B2

SELF-CLEANING SMUDGE-RESISTANT STRUCTURE AND RELATED FABRICATION METHODS

TECHNICAL FIELD

The subject matter described herein relates generally to electronic display systems, and more particularly, embodiments of the subject matter relate to transparent structures for use with touch-sensing devices in electronic display systems.

BACKGROUND

Traditionally, electronic displays are interfaced with a user via mechanical controls, such as knobs, buttons, or sliders, in order to enable a user to control or adjust various system properties. Touchscreen technology enables many system designers to reduce the space requirements for an electronic display system by integrating or incorporating the mechanical control functionality into the display. Accordingly, electronic equivalents of the traditional mechanical controls have been developed to allow a user to adjust system properties via a touchscreen interface.

Repetitive use of the touchscreen interface may result in fingerprints, smudges, scratches, and/or other marks on the surface of a touchscreen display. These markings degrade the clarity of the display, which in turn, increases the difficulty of reading or otherwise comprehending the content displayed on the display. For example, fingerprints and/or smudges may increase the surface reflection, cause the display to appear hazy or blurred, or washed out or otherwise undesirably impair the image quality perceived by a user. These problems are exacerbated in high ambient lighting conditions, such as, for example, in the cockpit of an aircraft during flight. Accordingly, it is desirable to provide a display surface that is resistant to fingerprints, smudges, scratches, and/or other marks without degrading the display image quality.

BRIEF SUMMARY

In one exemplary embodiment, an apparatus for a smudge-resistant structure is provided. The smudge-resistant structure includes a transparent substrate having a macrostructured surface configured to reduce contact with the smudge-resistant structure and an oxidizing layer overlying the macrostructured surface.

In another embodiment, a smudge-resistant structure includes a transparent substrate. The transparent substrate includes a macrostructured surface of an inorganic material, with the macrostructured surface being configured to inhibit formation of a continuous region of a contaminant that may result from contact with the smudge-resistant structure. The smudge-resistant structure also includes an oxidizing layer overlying the macrostructured surface. The oxidizing layer includes a photocatalytic oxidation material reactive to at least a portion of light in a visible portion of the electromagnetic spectrum to oxidize at least a portion of the contaminant.

In yet another embodiment, a method of fabricating a smudge-resistant structure is provided. The method involves forming a macrostructured surface on a transparent substrate, with the macrostructured surface being configured to reduce contact with the transparent substrate, and forming an oxidizing layer overlying the macrostructured surface. In exemplary embodiments, the oxidizing layer oxidizes at least a portion of any contaminant on the smudge-resistant structure resulting from the contact with the smudge-resistant structure.

BRIEF DESCRIPTION OF THE DRAWINGS

Embodiments of the subject matter will hereinafter be described in conjunction with the following drawing figures, which are not necessarily drawn to scale, wherein like numerals denote like elements, and:

FIGS. 1-3 are cross-sectional views that illustrate a smudge-resistant structure and exemplary methods for fabricating the smudge-resistant structure in accordance with one or more exemplary embodiments.

DETAILED DESCRIPTION

Figure 4:
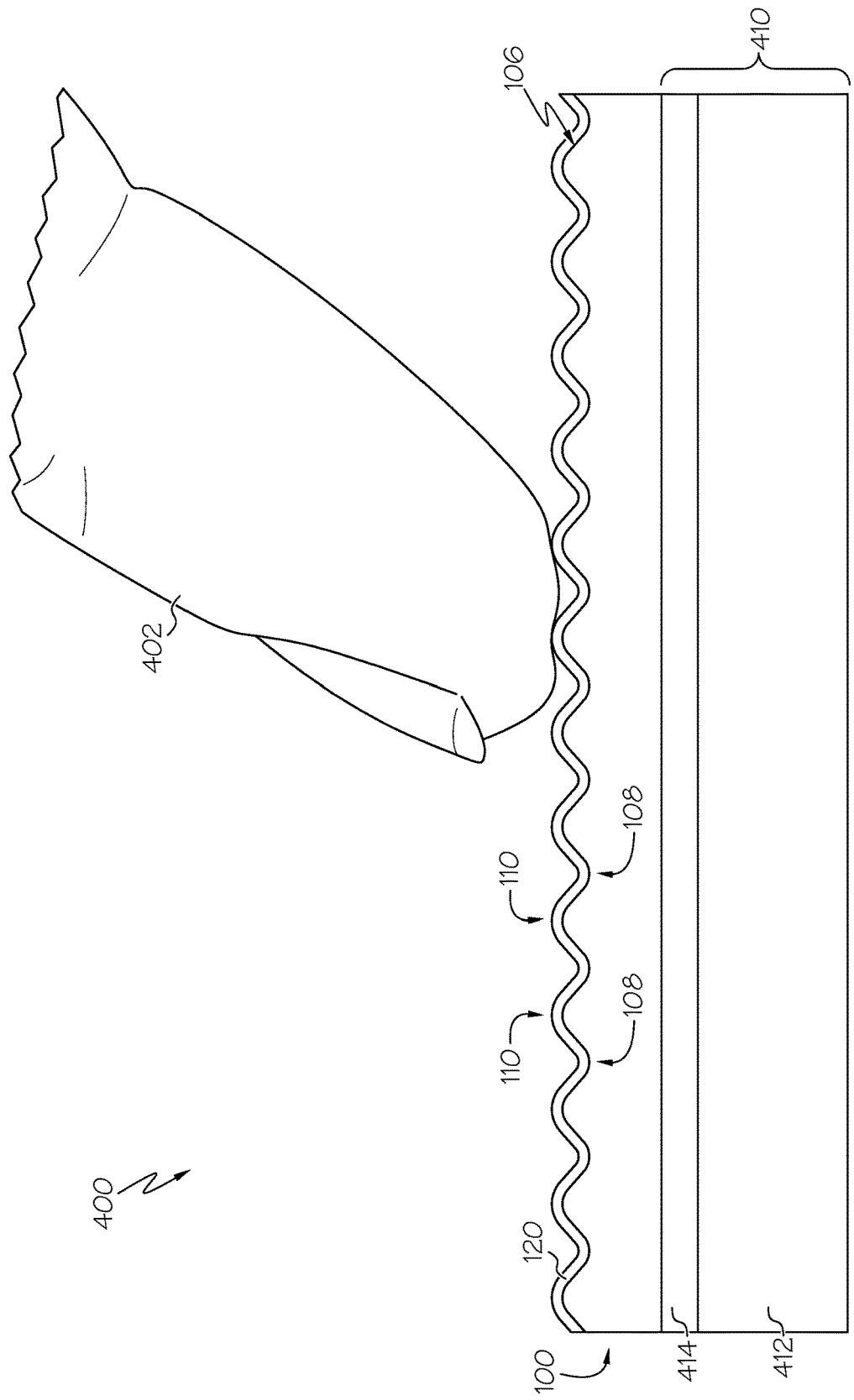
FIG. 4 is a cross-sectional view that illustrates an exemplary embodiment of a display system that includes a smudge-resistant structure formed in accordance with a fabrication process described in the context of FIGS. 1-3 in accordance with one or more exemplary embodiments.

Embodiments of the subject matter described herein relate to a smudge-resistant structure suitable for use with display devices, touchscreens, touch panels, or other devices where it is desirable protect from fingerprints, smudges, and/or other surface markings. In exemplary embodiments described herein, the smudge-resistant structure includes a transparent substrate having a macrostructured surface that is configured to reduce the amount of physical contact to an exposed surface of the smudge-resistant structure, and thereby break up, redistribute, or otherwise inhibit formation of a continuous region of a fingerprint or another contaminant on the exposed surface of the smudge-resistant structure. For example, the macrostructured surface may be realized as a unitary surface of the substrate material that has undulations or other surface variations that are configured to reduce the amount (or percentage) of a finger that is capable of contacting that surface, and thereby reduce the amount (or percentage) of fingerprint residue that may be imparted on that surface. As used herein, a "macrostructured surface" should be understood as referring to a surface having a lateral spacing (e.g., separation distance 114) between vertical profile variations on the order of 10 micrometers (or microns) or more, with the vertical profile variations (e.g., height 112) being on the order of 1 micrometer (or micron) or more to minimize the physical contact area between a finger and the smudge-resistant structure, as described in greater detail below in the context of FIG. 2.

As described in greater detail below in the context of FIG. 4, the macrostructured surface reduces the percentage of an external object that is capable of actually physically contacting an exposed surface of the smudge-resistant structure. For example, in one embodiment, the macrostructured surface may be configured to contact only about 10% of a typically-sized human finger that is in close proximity to the smudge-resistant structure, thereby preventing about 90% of a typically-sized human fingerprint from physically contacting the exposed surface of the smudge-resistant structure. In exemplary embodiments, the macrostructured surface is configured to provide relatively low diffuse reflectance (e.g., less than about 0.5%) and relatively low specular reflectance (e.g., less than about 2%) while also providing a relatively high transmittance (e.g., greater than about 90%).

As described in greater detail below in the context of FIGS. 3-4, the transparent smudge-resistant structure also includes an oxidizing layer overlying the macrostructured surface that is configured to oxidize any contaminant imparted on contacted portions of the macrostructured surface of the substrate. For example, the oxidizing layer may vaporize organic components of the contaminant, thereby removing the organic components of the contaminant from the macrostructured surface. In other words, the oxidizing layer may automatically remove portions of contaminant from the exposed surface of the smudge-resistant structure without any manual intervention to provide a so-called "self-cleaning" smudge-resistant structure. In exemplary embodiments, the oxidizing layer includes a photocatalytic material that is reactive to (or responsive to irradiation by) a portion of the electromagnetic spectrum to produce a hydroxyl radical that oxidizes carbon compounds by converting them to carbon dioxide or other gaseous compounds. For example, in one embodiment, the photocatalytic material is realized as a titanium oxide material, such as anatase phase titanium dioxide. In one or more embodiments, the photocatalytic material is doped with nitrogen atoms to extend its range of photosensitivity from the ultraviolet portion of the electromagnetic spectrum into at least a portion of the visible light portion of the electromagnetic spectrum. Substitutional doping of titanium dioxide with nitrogen narrows the band gap of titanium dioxide and creates energy levels above the valence band to extend the optical absorption into the visible range (wavelengths greater than 400 nm). Other appropriate substitutional doping elements such as sulfur may also be used instead of and/or in addition to nitrogen.

By virtue of the macrostructured surface reducing the amount (or percentage) of physical contact that is made with the exposed surface of the transparent smudge-resistant structure combined with the oxidizing layer oxidizing portions of any contaminant that may be imparted on the relatively few contacted portions of the macrostructured surface, the potential impact of fingerprints, smudges, and/or other surface markings are mitigated. Additionally, the oxidizing layer reduces frequency by which the exposed surface of the transparent smudge-resistant structure may need to be manually or actively cleaned, thereby improving its durability and/or longevity by reducing the exposure to potentially abrading elements, solvents or other cleaning agents. Besides increasing the duration between manual or active cleanings, the self-cleaning characteristics provided by the oxidizing layer minimize the potential impact of fingerprints for safety critical applications, such as, for example, touchscreen applications onboard an aircraft. Furthermore, the transparent substrate may be realized using an inorganic material that provides a higher level of durability relative to polymeric or organic substrates. The transparent smudge-resistant structure may be affixed to the surface of a display, touchscreen, touch panel, or another display device to provide a smudge-resistant display surface having relatively low surface reflection and relatively high durability.

FIGS. 1-3 illustrate, in cross-section, fabrication of a smudge-resistant structure 100 having a macrostructured surface 106 configured to inhibit formation of a continuous region of a contaminant on the surface of a substrate 102 and an oxidizing layer 120 configured to oxidize at least a portion of an organic contaminant on the macrostructured surface 106. Various implementation aspects of the fabrication processes described herein are well known and so, in the interest of brevity, many conventional aspects will only be mentioned briefly herein or will be omitted entirely without providing the well-known process details.

Referring to FIG. 1, in exemplary embodiments, the substrate 102 includes a layer of an inorganic material 104. As used herein, an inorganic material should be understood as a non-polymeric chemical compound that does not include carbon. In this regard, the inorganic material 104 is physically harder and exhibits greater durability with respect to mechanical abrasion as compared to polymeric materials. For example, the inorganic material 104 may be realized as a glass material, such as soda-lime glass, borosilicate glass, alumino-silicate glass, sapphire, a silicon oxide material, such as silicon dioxide, or any other material having the same general properties and characteristics described herein in the context of the transparent substrate 102. Additionally, it should be noted that in alternative embodiments, the substrate 102 may be realized as a polymer material having the same general properties and characteristics described herein in the context of the transparent substrate 102, such as polyethylene terephthalate (PET), polyethylene naphthalate (PEN), polycarbonate (PC), or the like. That said, for purposes of explanation, exemplary embodiments may be described herein in the context of the substrate 102 being realized as an inorganic material 104 because inorganic materials may be more durable and resistant to scratching or other forms of structural damage that may result from physical contact along with being resistant to fluids and solvents commonly used to clean display surfaces that may damage polymer materials. For example, the inorganic material 104 may have a pencil hardness greater than about six (6H) (e.g., greater than steel wool), such that the inorganic material 104 resists scratching and/or surface marking that would otherwise result from touching or otherwise abrading the surface of the inorganic material 104 with a finger and/or fingernail, a stylus, a pen, or another object that may be used to interface with a touch-sensing device (e.g., display, touchscreen, touch panel, or the like) that the smudge-resistant structure 100 may be subsequently affixed to.

In an exemplary embodiment, the substrate 102 and/or the inorganic material 104 has a transparency (or transmittance) greater than about ninety-five percent for visible light. In this regard, the substrate 102 and the inorganic material 104 are each substantially transparent. Accordingly, for convenience, the substrate 102 may alternatively be referred to herein as a transparent substrate, and the inorganic material 104 may alternatively be referred to herein as a transparent inorganic material. In one or more embodiments, the inorganic material 104 has a refractive index less than about 2.0, and preferably within the range of about 1.4 to about 1.7. In an exemplary embodiment, the thickness and type of inorganic material 104 are both chosen such that the substrate 102 does not interfere with touch-sensing capabilities of a touchscreen, touch panel, or another touch-sensing device that the smudge-resistant structure 100 may be subsequently affixed to. In this regard, in practice, the particular material 104 utilized for the substrate 102 and the thickness of the substrate 102 will vary depending on the needs of the particular application. For example, in embodiments where the inorganic material 104 is realized as a rigid glass material, the glass material may have a thickness of about two millimeters or less when used with infrared or other optical touch sensing technologies and a thickness within the range from about 50 microns (or micrometers) to about 100 microns when used with resistive or capacitive touch sensing technologies.

Referring now to FIGS. 1-2, in exemplary embodiments, the inorganic material 104 of the substrate 102 may initially have a substantially planar exposed surface 106 that is etched, roughened, or otherwise processed to provide surface variations in the inorganic material 104, resulting in the macrostructured surface 106 depicted in FIGS. 2-3. In this regard, the macrostructured surface 106 is a unitary surface of the substrate 102 and/or material 104 having variations in its cross-sectional profile. For example, as illustrated, the macrostructured surface 106 may undulate or otherwise vary from recessed portions 108 etched into the substrate material 104 to raised portions 110 of the substrate material 104. In exemplary embodiments, the macrostructured surface 106 has a surface roughness in the range of about 1.0 microns to about 5.0 microns.

Referring to FIG. 2, in exemplary embodiments, the height 112 of the raised portions 110 relative to the recessed portions 108 and the separation distance 114 (or spacing) between a respective raised portion 110 and adjacent (or neighboring) raised portions 110 are cooperatively configured to reduce the amount (or percentage) of the surface 106 that is contacted by external objects. In this regard, when the inorganic material 104 is rigid, the height 112 and separation distance 114 cooperate to prevent external objects having a lateral dimension greater than the separation distance 114 from contacting the recessed portions 108 and/or sidewall portions 118 of the substrate 102 and/or material 104. The height 112 of each respective raised portion 110 relative to its adjacent recessed portions is greater than 1.0 microns, and in one or more exemplary embodiments, within the range of about 1.0 microns to about 5.0 microns. The separation distance 114 between neighboring raised portions 110 is also greater than 10 microns, and in one or more exemplary embodiments, within the range of about 10 microns to about 100 microns. In exemplary embodiments, the angle 116 of the sidewalls 118 of a respective raised portion 110 relative to the surface tangent of the raised portion 110 is such that the macrostructured surface 106 has relatively high transmittance, relatively low diffuse reflectance, and relatively low specular reflectance. In this regard, the sidewalls 118 of the raised portions 110 are not vertical (e.g., not perpendicular to the plane of the substrate 102) such that the variations between the raised portions 110 and the recessed portions 108 are relatively gradual. In exemplary embodiments, the macrostructured surface 106 has a transmittance greater than 90 percent for the visible light portion of the electromagnetic spectrum.

Still referring to FIGS. 1-2, in accordance with one or more embodiments, the recessed portions 108 are formed by performing a maskless chemical etch process to randomly remove portions of the inorganic material 104 across the surface 106 of the substrate 102. In this regard, the etch process is tuned to achieve the heights 112, separation distances 114, and sidewall angles 116 that impart the desired characteristics to the macrostructured surface 106, as described above. In other embodiments, the inorganic material 104 may be etched using an etch mask that is patterned to provide a desired arrangement of the recessed portions 108 relative to the raised portions 110. In other embodiments, the recessed portions 108 may be formed by embossing or stamping.

Referring now to FIG. 3, fabrication of the smudge-resistant structure 100 continues by forming the oxidizing layer 120 overlying the macrostructured surface 106. In exemplary embodiments, the oxidizing layer 120 conforms to the macrostructured surface 106 and provides a continuous intervening layer such that physical contact with the exposed surface of the smudge-resistant structure 100 occurs at the oxidizing layer 120. In exemplary embodiments, the oxidizing layer 120 includes a photocatalytic material that is configured to produce a hydroxyl radical in response to irradiation by a portion of the electromagnetic spectrum. Thereafter, the hydroxyl radical oxidizes organic components of any contaminant that may be imparted on the contacted portions of the exposed surface of the smudge-resistant structure 100. For example, the oxidizing layer 120 may include a titanium oxide material, such as titanium dioxide, that produces hydroxyl radicals in response to wavelengths in the ultraviolet portion of the electromagnetic spectrum.

In exemplary embodiments, the oxidizing layer 120 is doped with nitrogen to extend the range of photosensitivity for the photocatalytic material into at least a portion of the visible portion of the electromagnetic spectrum. In this regard, the atomic concentration of the nitrogen within the oxidizing layer 120 may be configured to increase the wavelengths the photocatalytic material reacts to into at least the blue portion of the visible light spectrum (e.g., wavelengths greater than 400 nm). In exemplary embodiments, the atomic concentration of nitrogen in the oxidizing layer 120 is greater than about one percent to increase the photosensitivity of the photocatalytic material into the visible portion (e.g., wavelengths greater than 400 nm) of the light spectrum.

In accordance with one or more embodiments, the oxidizing layer 120 is formed by conformably depositing a layer of titanium oxide material overlying the macrostructured surface 106. For example, a layer of anatase phase titanium dioxide may be deposited on the exposed macrostructured surface 106 by performing a plasma-enhanced chemical vapor deposition (PECVD) process or a physical vapor deposition (PVD) process (e.g., a sputtering deposition process). In exemplary embodiments, the deposited layer of titanium dioxide has a thickness in the range of about 50 nanometers to about 200 nanometers, and more preferably, about 100 nanometers. The deposited titanium dioxide film may be subsequently heat treated or annealed at temperatures in the range of 100° C. to 300° C. to improve its adhesion to macrostructured surface. In accordance with one or more embodiments, the titanium dioxide layer 120 is in-situ doped by adding nitrogen to the reactants used to deposit the titanium dioxide, resulting in a nitrogen-doped titanium dioxide material being deposited on the exposed macrostructured surface 106. In other embodiments, the titanium dioxide layer 120 may be doped by performing one or more ion implantation processes to implant nitrogen ions into the titanium dioxide material.

In another embodiment, the oxidizing layer 120 is formed by applying, to the macrostructured surface 106, a layer of a solution containing titanium dioxide nanoparticles suspended in a solvent, such as an alcohol (e.g., ethyl alcohol). For example, a layer of ethyl alcohol containing anatase phase titanium dioxide particles suspended therein may be applied to the macrostructured surface 106 by spin coating, dip coating, or solution printing. In exemplary embodiments, the suspended titanium dioxide particles have a longest dimension (e.g., a diameter of a substantially spherical shape) in the range of about 10 nm to about 50 nm. In this regard, particle sizes less than 10 nm may result in quantum confinement effects, while particle sizes greater than 50 nm may degrade transmittance. A photocatalytic layer may be formed from a solution containing titanium dioxide particles by applying the solution (e.g., spin coating, dip coating, solution printing, or the like), drying the solution, and then heating the structure 100 to evaporate the solvent and adhere the titanium dioxide particles to the macrostructured surface 106.

In accordance with one or more embodiments, a nitrogen-doped photocatalytic layer may be formed by introducing nitrogen when forming titanium dioxide particles (e.g., by introducing nitrogen gas or a nitrogen-containing gas during the process to form the titanium dioxide particles), with the nitrogen-doped titanium dioxide particles being suspended in the solvent material (e.g., ethyl alcohol). The photocatalytic layer formation may then be completed by and the solvent and heating (or annealing) the structure 100 to a temperature in the range of about 100° C. to about 300° C., resulting in a layer of nitrogen-doped titanium dioxide particles. In alternative embodiments, the photocatalytic matrix may be doped by performing one or more ion implantation processes to implant nitrogen ions into the photocatalytic layer after it is applied to the macrostructured surface 106.

In another embodiment, the titanium dioxide nanoparticles may be interspersed or intermixed with other nanoparticles, such as silicon dioxide nanoparticles, and suspended in a solvent prior to the application process step (e.g., spin coating, dip coating, solution printing, or the like). In this regard, the other nanoparticles may be utilized to control the titanium dioxide particle density in the photocatalytic layer and/or increase adhesion of the photocatalytic layer to the macrostructured surface 106. In such embodiments, after evaporation of solvent during subsequent heat treatment, the resulting oxidizing layer 120 contains titanium dioxide nanoparticles that are interspersed within silicon dioxide nanoparticles, or other nanoparticles as appropriate. In yet other embodiments, the oxidizing layer 120 is formed by applying, to the macrostructured surface 106, a layer of a matrix or binder material that has particles of photocatalytic material suspended therein.

Referring now to FIG. 4, in one or more exemplary embodiments, the smudge-resistant structure 100 is utilized with a display device 410 in a display system 400. In accordance with one embodiment, the display system 400 is utilized in high ambient lighting conditions, such as in the cockpit of an aircraft (e.g., as part of a so-called "glass cockpit"). The smudge-resistant structure 100 is disposed proximate the display device 410 and aligned with respect to the display device 410 such that the smudge-resistant structure 100 is interposed in the line-of-sight between a user and the display device 410 when the user views content displayed on the display device 410. In this regard, from the perspective of a user and/or viewer of the display device 410, the smudge-resistant structure 100 overlaps and/or overlies at least a portion of the display device 410. In one or more embodiments, an adhesive material is formed or otherwise provided on the surface of the smudge-resistant structure 100 that is opposite the macrostructured surface 106 and utilized to affix the smudge-resistant structure 100 to the display surface of the display device 410. In alternative embodiments, the smudge-resistant structure 100 may be separated from the display surface by an airgap (e.g., by providing an adhesive material with an appropriate thickness only about the periphery of the smudge-resistant structure 100 to separate the smudge-resistant structure 100 from the display device 410 by the thickness of the adhesive).

In exemplary embodiments, the display device 410 is realized as a touchscreen or another touch-sensing device that includes a display 412 and a transparent touch panel 414. Depending on the embodiment, the display 412 may be realized as a liquid crystal display (LCD), an light emitting diode (LED) display, an organic light emitting diode (OLED) display, an electrophoretic display, or another electronic display capable of presenting images under control of a processing module (e.g., a processor, controller, or the like). The touch panel 414 is disposed proximate the display 412 and aligned with respect to the display 412 such that the touch panel 414 is interposed in the line-of-sight when the user views content displayed on the display 412. The touch panel 414 provides or otherwise defines an active sensing region of the display device 410, that is, a region of the display device 410 that is capable of sensing contact and/or sufficient proximity to an external object 402 (e.g., a finger and/or fingernail, a stylus, a pen, or the like). In this regard, the smudge-resistant structure 100 is disposed such that the smudge-resistant structure 100 overlaps and/or overlies the sensing region of the display device 410. Depending on the embodiment, the touch panel 414 may be realized as a resistive touch panel, a capacitive touch panel, an infrared touch panel or another type of optical touch panel, or another suitable touch panel. As described above, by virtue of the relatively high transmittance and relatively low reflectance of the macrostructured surface 106, the scattering and/or diffusion of the light transmitted by the display 412 that is incident on the smudge-resistant structure 100 is minimized or otherwise imperceptible.

As described above, by virtue of the macrostructured surface 106, an external object 402 used to interface with the touch panel 414 may only contact the smudge-resistant structure 100 at or near the raised portions 110 while the recessed portions 108 of the smudge-resistant structure 100 are not contacted by the object 402. For example, in one exemplary embodiment where the external object 402 is realized as a human finger, the height 112, separation distance 114, and sidewall angles 116 are configured such that only about 10% of the surface area of the finger 402 contacts the raised portions 110 (and potentially the adjacent portions of the sidewalls 118) while the remaining surface area of the finger 402 is prevented from contacting the recessed portions 108 and the adjacent sidewall portions 118 by virtue of the rigidity of the inorganic material 104. Accordingly, the amount of contaminant that may be deposited on the smudge-resistant structure 100 by the finger 402 may be reduced by a corresponding amount (or percentage), thereby mitigating the potential impact of such contaminant with respect to the perceived image quality provided by the display device 410 and/or display 412. Additionally, by virtue of the oxidizing layer 120 comprising a photocatalytic material, in high ambient lighting conditions, organic components of any contaminant that may be deposited on the contacted raised portions 110 (and possibly sidewall portions 118 adjacent thereto) of the smudge-resistant structure 100 may be oxidized by hydroxyl radicals resulting from photocatalysis in response to ambient light illumination. Thus, not only is the amount of percentage of the contaminant that may be deposited on the smudge-resistant structure 100 reduced by virtue of the macrostructured surface 106, but the amount or percentage of the contaminant that may reside on the smudge-resistant structure 100 is further reduced by virtue of the "self-cleaning" property of the photocatalytic material. For example, in practice, the smudge or fingerprint residue resulting from contact with a finger 402 predominantly contains organic matter (e.g., typically about 90% or more organic material), which will be oxidized and thereby removed from the smudge-resistant structure 100 by the oxidizing layer 120. Accordingly, only a relatively small amount of contaminant may accumulate on the smudge-resistant structure 100, which, in turn, may be cleaned from surface of the smudge-resistant structure 100 without damaging the inorganic material 104, as described above. Additionally, it should be noted that the hydroxyl radicals may prevent or otherwise inhibit bacterial growth on the smudge-resistant structure 100 by oxidizing bacteria that contacts the surface.

The foregoing detailed description is merely exemplary in nature and is not intended to limit the subject matter of the application and uses thereof. Furthermore, there is no intention to be bound by any theory presented in the preceding background, brief summary, or the detailed description. For the sake of brevity, conventional techniques related to optics, reflection, refraction, photocatalysis, deposition, etching, ion implantation and/or doping, touch-sensing devices and/or display devices may not be described in detail herein.

While at least one exemplary embodiment has been described in the foregoing detailed description, it should be appreciated that a vast number of alternate but equivalent variations exist, and the exemplary embodiments described herein are not intended to limit the scope, applicability, or configuration of the subject matter in any way. To the contrary, it should be understood that various changes may be made in the function and arrangement of the various elements described herein without departing from the scope of the claims and their legal equivalents. Accordingly, details of the exemplary embodiments or other limitations described above should not be read into the claims absent a clear intention to the contrary.

What is claimed is:

1. A smudge-resistant structure comprising:
a transparent planar substrate, of a rigid transparent inorganic material having a macrostructured surface including a plurality of raised portions of the rigid transparent inorganic material configured to prevent contact with recessed portions of the rigid transparent inorganic material of the macrostructured surface of the transparent planar substrate by 90% of the surface area of an external object in proximity to the transparent planar substrate and having a lateral dimension greater than a separation distance between neighboring raised portions, wherein the separation distance between neighboring raised portions is within the range of 12 microns to 100 microns and sidewalls of a respective raised portion of the plurality of raised portions are not vertical;
an oxidizing layer on and overlying the macrostructured surface, wherein a thickness of the oxidizing layer is in a range of about 50 nm to about 200 nm; and
an adhesive material on a second surface of the transparent planar substrate, the second surface being opposite the macrostructured surface.

2. The smudge-resistant structure of claim 1, wherein:
the macrostructured surface comprises a plurality of recessed portions in the inorganic material; and
the plurality of recessed portions are randomly distributed.

3. The smudge-resistant structure of claim 1, wherein the macrostructured surface comprises a plurality of recessed portions in the transparent planar substrate and the plurality of raised portions of the transparent planar substrate between respective recessed portions of the plurality of recessed portions, wherein each of the plurality of raised portions are spaced apart from another of the plurality of raised portions by the separation distance.

4. The smudge-resistant structure of claim 1, wherein the macrostructured surface comprises a plurality of recessed portions in the transparent planar substrate and the plurality of raised portions of the transparent planar substrate between respective recessed portions of the plurality of recessed portions, wherein a height of each of the plurality of raised portions relative to an adjacent recessed portion of the plurality of recessed portions is in a range of about 1 microns to about 5 microns.

5. The smudge-resistant structure of claim 1, wherein the macrostructured surface has a surface roughness in a range of about 1.0 microns to about 5.0 microns.

6. The smudge-resistant structure of claim 1, wherein the macrostructured surface has a diffuse reflectance less than 0.5 percent.

7. The smudge-resistant structure of claim 1, wherein the oxidizing layer comprises a photocatalytic material.

8. The smudge-resistant structure of claim 7, wherein the photocatalytic material comprises a nitrogen-doped titanium oxide material.

9. The smudge-resistant structure of claim 8, wherein a concentration of nitrogen in the nitrogen-doped titanium oxide material is greater than one percent.

10. The smudge-resistant structure of claim 7, wherein the photocatalytic material is reactive to at least a portion of light in a visible portion of the electromagnetic spectrum.

11. The smudge-resistant structure of claim 1, wherein the oxidizing layer comprises a titanium dioxide material including a substitutional doping element that creates energy levels in a band gap of titanium dioxide to extend absorption of optical energy to visible wavelengths.

12. The smudge-resistant structure of claim 1, wherein the oxidizing layer comprises titanium oxide particles suspended in a matrix.

13. A display system comprising:
a display device having a touch panel; and
a smudge-resistant structure affixed to a surface of the display device and overlying the touch panel, wherein the smudge-resistant structure comprises:
a transparent planar substrate of a rigid transparent inorganic material having a macrostructured surface including a plurality of raised portions of the rigid transparent inorganic material configured to prevent contact with recessed portions of the rigid transparent inorganic material of the macrostructured surface of the transparent planar substrate by 90% of the surface area of an external object in proximity to the transparent planar substrate and having a lateral dimension greater than a separation distance between neighboring raised portions, wherein the separation distance between neighboring raised portions is within the range of 12 microns to 100 microns and sidewalls of a respective raised portion of the plurality of raised portions are not vertical; and
an oxidizing layer on and overlying the macrostructured surface, wherein a thickness of the oxidizing layer is in a range of about 50 nm to about 200 nm.

14. A smudge-resistant structure comprising:
a transparent planar substrate of a rigid transparent inorganic material having a macrostructured surface configured to inhibit formation of a continuous region of a contaminant, wherein the macrostructured surface comprises a plurality of raised portions of the rigid transparent inorganic material configured to prevent contact with recessed portions of the rigid transparent inorganic material of the macrostructured surface of the transparent planar substrate by 90% of the surface area of an external object in proximity to the transparent planar substrate, the external object having a lateral dimension greater than a separation distance between neighboring raised portions, wherein each of the plurality of raised portions are spaced apart from another of the plurality of raised portions by a separation distance within the range of 12 microns to 100 microns and an angle of sidewalls of a respective raised portion of the plurality of raised portions relative to a surface tangent of the respective raised portion is such that the macrostructured surface has a transmittance greater than about 90 percent for a visible portion of the electromagnetic spectrum and a diffuse reflectance less than about 0.5 percent; and an oxidizing layer on and overlying the macrostructured surface and having a thickness in a range of about 50 nm to about 200 nm, the oxidizing layer comprising a photocatalytic material, wherein the photocatalytic material is reactive to at least a portion of light in the visible portion of the electromagnetic spectrum to oxidize at least a portion of the contaminant; and an adhesive material on a second surface of the transparent planar substrate, the second surface being opposite the macrostructured surface and affixed to a display device.

15. The smudge-resistant structure of claim 14, wherein:

the macrostructured surface comprises a plurality of recessed portions in the inorganic material and a plurality of raised portions of the inorganic material between respective recessed portions of the plurality of recessed portions; and a height of each of the plurality of raised portions relative to an adjacent recessed portion of the plurality of recessed portions is in a range of about 1 microns to about 5 microns.

16. The smudge-resistant structure of claim 15, wherein:

the photocatalytic material is reactive to at least a portion of light in a visible portion of the electromagnetic spectrum; and the portion of light has a wavelength greater than 400 nm.

17. The smudge-resistant structure of claim 1, wherein the macrostructured surface is configured to contact 10% of a finger in proximity to the smudge-resistant structure.

18. The smudge-resistant structure of claim 1, wherein an angle of the sidewalls of the respective raised portion of the plurality of raised portions relative to a surface tangent of the respective raised portion is such that the macrostructured surface has a transmittance greater than 90 percent for a visible portion of the electromagnetic spectrum and a diffuse reflectance less than 0.5 percent.

19. The smudge-resistant structure of claim 12, wherein a longest dimension of the titanium oxide particles is in the range of 10 nanometers to 50 nanometers.

20. The smudge-resistant structure of claim 19, wherein:

the oxidizing layer is reactive to at least a portion of light in a visible portion of the electromagnetic spectrum; and the portion of light has a wavelength greater than 400 nm.

* * * * *